United States Patent
Mafra-Neto et al.

(10) Patent No.: US 6,766,251 B2
(45) Date of Patent: Jul. 20, 2004

(54) METHOD FOR PEST MANAGEMENT USING PEST IDENTIFICATION SENSORS AND NETWORK ACCESSIBLE DATABASE

(75) Inventors: Agenor Mafra-Neto, Riverside, CA (US); Reginald R. Coler, Riverside, CA (US)

(73) Assignee: ISCA Technologies, Inc., Riverside, CA (US)

( * ) Notice: Subject to any disclaimer, the term of this patent is extended or adjusted under 35 U.S.C. 154(b) by 0 days.

(21) Appl. No.: 10/294,418

(22) Filed: Nov. 14, 2002

(65) Prior Publication Data

US 2003/0069697 A1 Apr. 10, 2003

(51) Int. Cl.⁷ .............................................. G06F 19/00
(52) U.S. Cl. ....................................................... 702/5
(58) Field of Search ...................... 702/2, 5, 14; 701/50

(56) References Cited

U.S. PATENT DOCUMENTS

| | | | | |
|---|---|---|---|---|
| 5,005,416 A | * | 4/1991 | Vick et al. ..................... | 73/587 |
| 5,566,069 A | * | 10/1996 | Clark, Jr. et al. ............... | 702/2 |
| 5,699,244 A | * | 12/1997 | Clark, Jr. et al. ............... | 702/2 |

* cited by examiner

Primary Examiner—Donald McElheny, Jr.
(74) Attorney, Agent, or Firm—Stetina Brunda Garred & Brucker

(57) ABSTRACT

In accordance with the present invention, there is provided a method of pest management by a grower. The method includes gathering pest sampling data in connection with a crop of the grower. The pest sampling data includes pest identification information gathered using a pest identification sensor. The pest sampling data further includes locational information thereof. The method further includes transmitting the gathered pest sampling data to a pest sampling database. The pest sampling database includes pest sampling data regarding respective crops from a plurality of other growers. The pest sampling database is in electrical communication with pest management analysis software for generation of pest management analysis. The method further includes electronically receiving the generated pest management analysis.

28 Claims, 2 Drawing Sheets

METHOD FOR PEST MANAGEMENT USING PEST IDENTIFICATION SENSORS AND NETWORK ACCESSIBLE DATABASE

CROSS-REFERENCE TO RELATED APPLICATIONS

This application is related to patent application of U.S. patent application Ser. No. 10/084,005, filed on Feb. 27, 2002, which is a continuation patent application of U.S. Pat. No. 6,385,544 filed on Feb. 5, 2001 and issued on May 7, 2002, the contents of which are incorporated herein by reference.

STATEMENT RE: FEDERALLY SPONSORED RESEARCH/DEVELOPMENT

Not Applicable.

BACKGROUND OF THE INVENTION

The present invention relates generally to pest management systems, and more particularly to a method for pest management using pest identification sensors and a network accessible database.

Integrated pest management is an informational science of obtaining accurate information regarding the many factors that affect the density, distribution, and dynamics of pest populations. The ultimate goal has always been to use that information to integrate control measures. Pest control measures are triggered either by the presence of a particular pest or by a threshold density of that pest, taking into consideration the phenology of the affected crop, and the physical and biological characteristics of the environment at a given time. Data on various physical and biological parameters must be collected, tabulated, filtered, statistically analyzed and compared, so that good decisions for effective pest control can be made and implemented in a timely fashion. There is, therefore, an ever-increasing demand for reliable, current data that reflect actual conditions found in the field upon which pest control management decisions can be based.

Pest management, control and monitoring programs frequently suffer from a lack of reliable information. For a monitoring program to be effective, information has to swiftly flow through a sequence that starts with data gathered in the field, which is passed through local supervisors and more central decision makers, and ends up with those who are responsible for the implementation of pest control measures.

A typical management program will include many branches for data management. The branches may have structural differences, may be operated by people belonging to different agencies, and may be located in different areas. Not surprisingly, bottlenecks in the flow of information are common. These bottlenecks may be caused by slow or imprecise data gathering or by slow and inefficient data processing. The result is information flowing too slowly to the decision maker. Further, inefficient or inconsistent data management can result in poorly collected data or a failure to separate relevant information from that which is irrelevant. Problems with information flow may generate reports with little useful information, resulting in poor decision-making and ineffectual control measures. Poor data management is damaging for small programs, but the situation becomes nearly unmanageable when data management problems occur in large area-wide pest management programs.

The food production industry has been plagued not only by pests that compromise crop and food quality but also with the task of managing information to control these pests. Indigenous and established arthropod pests are a major concern for farmers and ranchers and are the subject of study for entire divisions of large governmental agencies. The introduction of exotic pests is especially problematic for the agricultural industry. The industry is affected directly, by pest damage and extra expenses incurred through controlling new exotic pests, and indirectly, through trade barriers aimed at infested commodities by pest-free importing regions. Once a pest is established, the cost of control is permanent. An increase in imported goods, fostered by trade agreements between states, increases the risk of introduction of new pests.

Collaborative efforts will play an ever more critical role in the management of exotic pests. Many regional and even intercontinental task forces have been created to manage and combat exotic insect pests. These task forces require concerted, area-wide interventions, and are usually far more effective than the somewhat erratic, asynchronous interventions that individual farmers may perform when not involved in regionally controlled management efforts.

When an exotic pest is the focus of a management program, it is likely that the program involves different organizations, including agencies from city, county, state, and federal governments, as well as interested private groups. The organization for the monitoring and detection tasks may be flexible and relaxed. Different groups will collect different types of information, based upon their own particular agendas, which is then stored in databases at various locations. It is likely that these databases do not use the same software and are maintained and edited by persons of varying expertise, who use different criteria and protocols to handle and analyze the data. The unexpected detection of an exotic pest results in an emergency situation requiring a drastic change in this flexible organization. Pest eradication requires a program that is well coordinated. For emergency situations the organizational structure of a program has to be well established. All historical data and newly collected data have to be readily available and rapidly analyzed so the emergency regional pest control effort can make rapid, effective decisions.

Existing pest management programs vary in degree of sophistication. Most common is the approach in which farmers spray fields following a calendar schedule. The implementation of control measures is triggered based on historical data and executed regardless of the presence of or the density of the pest. This approach is generally attractive to growers due to its simplicity and ease of implementation. However, this approach frequently results in unnecessary insecticide applications, which may ultimately result in a plethora of agro-ecological problems including environmental contamination, ecological imbalance, and suppression of natural enemy populations.

More sophisticated regional strategies exist that monitor physical and biological environment and use the data to determine if populations are above or below thresholds to determine if control action is needed, referred to in the industry as the "threshold" approach. Such a pest control strategy has the advantage of being a good predictive power of pest population dynamics using modeling techniques. If pest control action is necessary, it is directed to the areas where pest populations are found at higher densities, or where they are escaping their natural enemies' control. This strategy in turn has a lower impact on the argo-ecosystem, and is the basis for the development of more sustainable agriculture. The difficulty with this approach is that it requires better than average organizational skills, a commitment from the farmer, the use of standardized methods of data collection, and enough allocation of time to perform the careful, consistent monitoring needed to support good decision-making.

Accordingly, there is a need in the art for an improved method of pest management in comparison to the prior art.

BRIEF SUMMARY OF THE INVENTION

In accordance with an embodiment of the present invention, there is provided a method of pest management of crops by a grower. The method includes gathering pest sampling data in connection with a crop of the grower. The pest sampling data includes pest identification information gathered using a pest identification sensor. The pest sampling data further includes locational information thereof. The method further includes transmitting the gathered pest sampling data to a pest sampling database. The pest sampling database includes pest sampling data regarding respective crops from a plurality of other growers. The pest sampling database is in electrical communication with pest management analysis software for generation of pest management analysis. The method further includes electronically receiving the generated pest management analysis.

According to various embodiments, the pest identification sensor may be an acoustic sensor, an optical sensor, or a weight sensor. The method may provide for using at least two different types of pest identification sensors. The pest identification sensor may be deployed in conjunction with a pest trap, and the pest trap may utilize a pest attractant and the pest sampling data includes identification of the attractant. The pest identification sensor may be configured to detect wingbeat information, pest surface characteristics information, and size information. The pest management analysis software may be configured to identify pests based upon the pest identification information and the locational information. The pest sampling data may be gathered utilizing a portable computer, and the pest identification information may be transmitted from the pest identification sensor via a wireless device.

In accordance with another aspect of the present invention, there is provided a method of providing pest management of a plurality of growers. The method includes establishing a relationship with the plurality of growers wherein each of the growers agrees to gather pest sampling data in connection with a crop of the grower. The pest sampling data includes pest identification information gathered using a pest identification sensor. The pest sampling data further includes locational information thereof. The method further includes electronically receiving gathered pest sampling data from the growers. The method further includes electronically storing the pest sampling data in a pest sampling database. The method further includes generating pest management analysis with pest management analysis software using the pest sampling database for a crop of a respective one of the growers.

According to various embodiments, the pest identification sensor may be an acoustic sensor, an optical sensor, or a weight sensor. The method may provide for using at least two different types of pest identification sensors. The pest identification sensor may be deployed in conjunction with a pest trap that utilizes a pest attractant and the pest sampling data includes identification of the attractant. The pest identification sensor may be configured to detect wingbeat information, pest surface characteristics information, or size information. The pest management analysis software may be configured to identify pests based upon the pest identification information and the locational information. The pest management analysis software may be configured to identify pests based upon the pest identification information and pest seasonal activity information, pest circadian rhythm information, pest geographical distribution information, pest habitat information, and pest attractant information.

As such, based on the foregoing, the present invention mitigates the inefficiencies and limitations associated with prior art pest management methods. Accordingly, the present invention represents a significant advance in the art.

BRIEF DESCRIPTION OF THE SEVERAL VIEWS OF THE DRAWING

These, as well as other features of the present invention, will become more apparent upon reference to the drawings wherein.

DETAILED DESCRIPTION OF THE INVENTION

Figure 1:
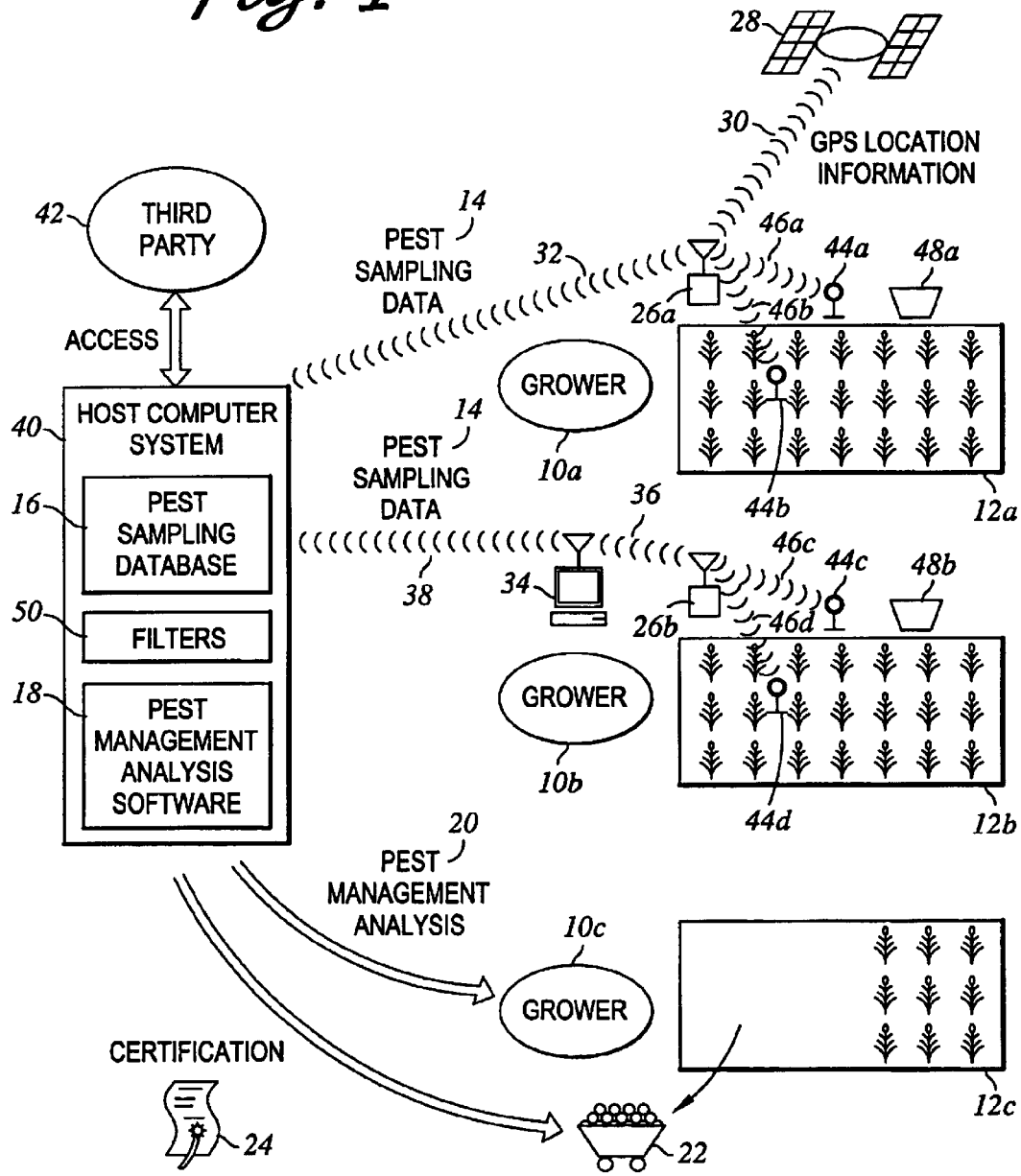
FIG. 1 is a symbolic relational diagram depicting the pest sampling database utilized by growers in accordance with a method of the present invention.
Figure 2:
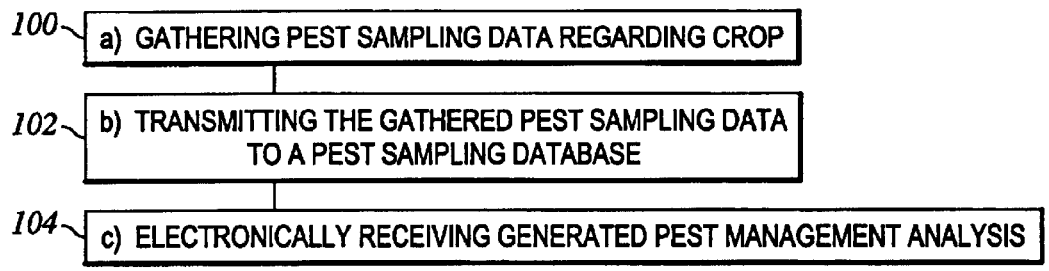
FIG. 2 is a flow chart of a method of an aspect of the present invention.
Figure 3:
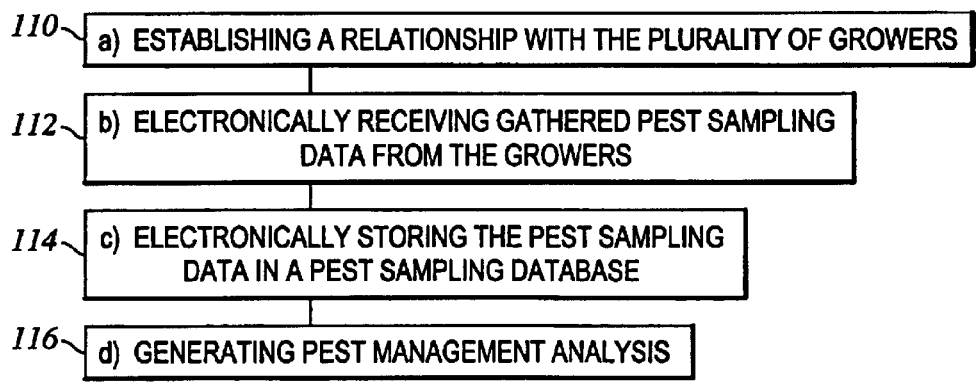
FIG. 3 is a flow chart of a method of another aspect of the present invention.

Referring now to the drawings wherein the showings are for purposes of illustrating a preferred embodiment of the present invention only, and not for purposes of limiting the same, FIGS. 1–3 illustrate methods for implementing aspects of the present invention.

Referring now to FIG. 1 there in depicted a symbolic relational diagram depicting the pest sampling database utilized by growers in accordance with a method of the present invention, a flow chart of which is depicted in FIG. 2. As will be discussed in more detail below, the present method is specifically adapted to provide incentives for many growers to participate so as to result in an integrated database of information that may be utilized for a variety of purposes by a variety of entities.

As such, there is provided a method of pest management of crops 12 by growers 10. As used herein growers 10 is used to refer generally to a grower or growers with specific examples depicted in FIG. 1 as 10a, b and c. Similarly, as used herein crops 12 is used to refer generally to a crop or crops with specific examples depicted in FIG. 1 as 12a–c.

According to an aspect of the invention, the method includes gathering 100 pest sampling data 14 in connection with a crop 12 of a grower 10. For example, grower 10a may gather 100 pest sampling data 14 in connection with the grower's crop 12a. In this regard, the following discussion will focus upon the perspective of the growers 10. The pest sampling data 14 includes pest identification information gathered using a pest identification sensor, such as sensors 44a–d. Additionally, the pest sampling data 14 includes locational information thereof. The gathered pest sampling data 14 is transmitted 102 to a pest sampling database 16. The pest sampling database 16 includes pest sampling data regarding respective crops 12 from a plurality of other growers 10. In this regard for example, to the extent grower 10a practices the method of the present invention, the other growers may include growers 10b and 10c. The pest sampling database 16 is in electrical communication with pest management analysis software 18 for generation of pest management analysis 20. The generated pest management analysis 20 is received 104 by the grower 10.

As mentioned above, the method includes gathering 100 pest sampling data 14 in connection with a crop 12 of a grower 10. The pest sampling data 14 may be gathered 100 utilizing a portable computer 26, such as 26a and 26b as depicted. As such, the portable computer 26 may be advantageously taken directly into the field for collection of pest sampling data 14. As used herein, the term computer includes any of those computing devices that are well known to one of ordinary skill in the art. For example, such computing devices may include laptop computers, terminals, hand-held or palm devices, etc.

As mentioned above, the pest sampling data 14 includes pest identification information gathered using a pest identification sensor, such as sensors 44a–d. To some degree the utilization of such sensors 44 advantageously automates the data gathering process.

Further, the pest identification information may be transmitted from the pest identification sensors 44a–d via a wireless device. In this regard, the pest identification sensors 44a–d may be readily deployed without the need for hardwire connections. Thus for example, the pest identification sensors 44a–b may establish electronic links 46a–b with the portable computer 26a for wireless transmission of the gathered information. Likewise, the pest identification sensors 44c–d may establish electronic links 46a–b with the portable computer 26b.

The pest identification sensors 44a–d may be of a variety of different types of sensors, such as acoustic, optical, or weight sensors. Moreover, the method may provide for using at least two different types of pest identification sensors 44a–d. The pest identification sensor 44 may be deployed in conjunction with a pest trap 48, such as sensor 44a which is deployed adjacent pest trap 48a and sensor 44c which is deployed adjacent pest trap 48b.

The pest identification sensors 44a–d may be configured to detect pest wingbeat information. A microphone may be a type of acoustic sensor that may be used to detect the pest wingbeat information. A light photo sensor may be a type of optical sensor that may be used to detect the pest wingbeat information. It is contemplated that with respect to flying pests, different pests may have a signature wingbeat in terms of frequency and/or harmonics for example. Such information may be used to identify pests. For general examples, mosquitoes have a wingbeat frequency in the range of 300–500 Hz, dragonflies in the range of 20–28 Hz, beetles in the range of 46–90 Hz, butterflies in the range of 9–12 Hz, hawk moths in the range of 70–85 Hz, horseflies at about 100 Hz, honey bees at about 200 Hz, and wasps at about 110 Hz. Moreover, within a given type of pest, such as mosquitoes, various species and subspecies may have specific wingbeat signatures. Further, the detected pest wingbeat information may include relative amplitudes of harmonics and other waveform shapes which may be correlated to a given pest wingbeat signature to aid in pest identification.

It is contemplated that various environmental conditions may influence a pest wingbeat signature of a type of pest. For example, some pests have a signature wingbeat that is a function of temperature or humidity. In this regard, the pest sampling data 14 may further include temperature and/or humidity measurements taken in relation to the detected pest wingbeat information.

As mentioned above, the pest identification sensors 44a–d may be weight sensors. For example, a piezo electric film may be calibrated to detect pest walking across the surface of the film. Weight data taken using such weight sensors may be further used to aid in pest identification.

Other characteristics may be detected using the sensors 44a–d. For example, pest surface characteristics information may be detected. Optical sensors may be used to detect such pest surface characteristics as color patterns and shapes for example. Another pest surface characteristic is reflectance of the outer surface of a pest. All arthropods have an outer shell (exoskeleton) that is often covered by a waxy film. With some arthropods this exoskeleton actually glows when illuminated with UV light. Sometimes, as with butterflies, moths and mosquitoes, the specimen is covered with little scales much like scales on a fish. Some mosquitoes have brown scales others have silvery white scales and still others have scales that appear to sparkle with a purplish iridescent reflection. Moreover, arthropods reflect light in specific frequencies. This may be in response to white light or from a series of light-emitting-diodes (of which each emits light in a specific wavelength, not necessarily visible) for example. As such, the detected reflectance may be used for pest identification.

Still other characteristics that may be detected using the sensors 44a–d may be size information. This may be implemented with the pest identification sensors 44a–d being optical sensors. Other characteristics may be detected such as presence of viruses through such sensors as those based upon enzyme-linked immunoassays. Other sensors may be based upon chromatography or flame ionization for detecting a pest signature for identification.

It is contemplated the pest sampling data 14 may be collected in the field. In particular, it is contemplated that precise locational data is desirable. In this regard, in an embodiment of the present invention, the locational information is gathered using an electronic locational device which may be integrated with the portable computer 26, such as 26a and 26b as depicted. Preferably, the electronic locational device is a global positioning system (GPS) based device such as portable computer 26a. In this regard, the portable computer 26a is symbolically depicted as being in electronic communication with a GPS satellite 28 via a data link 30. In another arrangement, the portable computer 26 may be provided with an optical scanner. An operator may simply scan in predetermined locational data which may be stored in the form of a bar code which is disposed adjacent a pest sampling or trapping location, for example. In this regard, it is envisioned that because the pest sampling data 14 is electronically inputted, such GPS and data scanning technologies may provide a means for capturing highly accurate locational data while being relatively easy to employ or implement by a grower 10.

It is contemplated that the pest management analysis software 18 may utilize a variety of filters 50 to aid in pest identification. In this regard, the filters 50 symbolically represent the programming logic or algorithms that take into consideration information in addition to the pest identification information gathered 100 by the pest identification sensors 44a–d. This information may be pest seasonal activity information, pest circadian rhythm information, pest geographical distribution information, pest habitat information, and pest attractant information for examples.

In this regard, where the gathered pest identification information is wingbeat information, there may be several pests that have a similar wing beat signature. By overlaying further information, however, the number of possible pests may be narrowed. For example, by knowing pest seasonal activity information and knowing the current date, several pests may be ruled out as possibilities as such pest may not be active. Similarly, certain pests may only be active at night (nocturnal) or during the day (diurnal) or in the transition between day and night (crepuscular). As such, by knowing when a pest was detected by the sensors 44a–d, such time stamp data may be used as a pest circadian rhythm informational filter for pest identification. Another example of a filter 50 relates to pest geographical distribution information. Certain pest may be affiliated with certain geographical areas. By knowing where the pest identification information was gathered 100 either via the gathered locational information or otherwise, such information may be used as a filter for pest identification. Another type of information that may be used as by the filters 50 is pest habitat information. Certain pests are only affiliated with certain habitats (swamps, woodlands, fields, etc.). As such, this information may be used by the filters 50 for pest identification.

As mentioned above, the pest identification sensors 44a,c may be deployed adjacent pest traps 48a,b. The pest traps 48a,b may utilize a pest attractant and the pest sampling data includes identification of the attractant. In this regard, certain attractants are specific to specific types of pests. As such, it is contemplated that by knowing the identification of the attractant utilized together with the pest identification information gathered from the sensor 44a,c the likelihood of accurate pest identification may be enhanced. Thus, the information regarding the attractant may be used by the programming logic or filters 50 for use by the pest management analysis software 18 to accurately identify pests.

It is contemplated that the pest sampling data 14 need not be gathered 100 and transmitted 102 in its entirety all at the same time. In this regard, some of the pest sampling data 14 may be initially gathered 100 and transmitted 102 to the pest sampling database 16 upon an initial set up of the various system components Furthermore, the pest sampling data 14 may include additional information which is well known to one of ordinary skill in the art such as information regarding pest populations and infestation, crop condition, climatological information, method of pest control used, for example. It is understood that the nature of the data will vary in degree, format and type depending upon the level of sophistication of the pest management analysis software 18 that is utilized.

Having gathered 100 the pest sampling data 14, the method provides for transmitting 102 such pest sampling data 14 to the pest sampling database 16. The present method contemplates that such a data transfer may be affected in any number of ways. In one embodiment, the portable computer 26 may be a wireless device that may transmit from the field the pest sampling data 14. In this regard, portable computer 26a is depicted as having a symbolic data link 32 to the pest sampling database 16. The particular techniques and hardware and software requirements for affecting such a wireless transfer may be chosen from those which are well known to one of ordinary skill in the art and may include cellular or radio frequency technology for example.

In another arrangement, the pest sampling data 14 may be downloaded from a portable computer 26b to a local computer 34. In this regard, a given grower 10 (such as grower 10b) may utilize many portable computers 26 (such as portable computer 26b) in the field that may be then taken back to the grower's facility having the local computer 34 thereat. In this regard, the collected pest sampling data 14 may be transferred and compiled at the local computer 34.

Such a data transmission or transfer may simply take the form of the data being recorded upon a data disk and physically downloaded to the local computer 34. A more sophisticated arrangement may include a more automated transmission which may include the portable computer 26b establishing an electronic data link 36 with the local computer 34. As such, the pest sampling data 14 may be transmitted via a more direct electronic connection, such as by the local computer 34 having a docking bay for receiving communications from the portable computer 26b. In another arrangement, the portable computer 26b may communicate with the local computer 26b via a wireless link. As such, the electronic data link 36 symbolically indicates some form of data transfer from the portable computer 26b to the local computer 34. The particular techniques, hardware and software requirements for affecting such data transfer from the portable computer 26b to the local computer 34 may be chosen from those which are well known to one of ordinary skill in the art and may include cellular or radio frequency technology for example.

In addition, it is contemplated that the local computer 34 electronically communicates with the pest sampling database 16. Conveniently, the pest sampling data 14 may be transferred from the local computer 34 to the pest sampling database 16 via a computer network. While the computer network is preferably what is currently understood as the Internet, other computer network arrangements may be included, such as local area networks (LANs), intranets, extranets, private networks, virtual private networks, integrated services digital networks (ISDNs), etc. The particular techniques and hardware and software requirements for affecting such data transfer from the local computer 34 to the pest sampling database 16 may be chosen from those which are well known to one of ordinary skill in the art and may include telephony based systems, cable (Digital Subscriber Lines (DSL) and variations thereof, wire, optical, etc.), optical communications (including infrared), and wireless forms of communications, such as those based upon cellular, satellite, radio frequency (RF) and other forms of electromagnetic wave based mediums.

It is contemplated that a remote or host computer system 40 may host or otherwise be disposed in electronic communication with the pest sampling database 16 and the pest management analysis software 18. The host computer system 40 may be disposed in communication with a computer network. In the case where the computer network is the Internet, it is contemplated that host computer system 40 may be interfaced or hosted at a web address. As such, access or utilization of the host computer system 40 may be provided by an application service provider (ASP) for example. The particular techniques and hardware and software requirements for operation of the host computer system 40 insofar as data processing between the pest sampling database 16 and the pest management analysis software 18 may be chosen form those which are well known to one of ordinary skill in the art. It is also contemplated that the pest sampling database 16 and/or the pest management analysis software 18, including portions thereof, need not be hosted remotely as discussed above but may also be deployed at a local computer 34 or even in a portable computer 26 (such as 26a or 26b) for use in the field.

As will be discussed further below, the pest management analysis software 18 may be based upon any variety of algorithms and software modules. In this regard, the pest management analysis software 18 is configured to generate pest management analysis 20 regarding a given grower's crops 12, such as in connection with the crops 12c of grower 10c. Such analysis may be received 104 or otherwise accessed by the grower 10c via a computer network.

In addition, the pest control analysis 20 may include a pest control recommendation, such as utilization of certain pesticide applications for example. In this regard, the method may further include implementing the pest control recommendation, and subsequently repeating the steps of gathering 100, transmitting 102 and receiving 104 pest control analysis 20.

At some point the growers 10 will harvest their crops 12 resulting in harvested crops 22. It is contemplated that such crops 12 or 22 may need to be inspected by a variety of entities, ranging from regulatory agencies to anyone in the supply chain of disposition of the harvested crops 22. Importantly, according to an aspect of the present invention, a crop certification 24 of the harvested crop 22 is received based upon the generated pest management analysis 20. The crop certification 24 may be received via a computer network. This may take the form of access to such information or an actual electronic communication. It is contemplated that such a certification 25 may parallel or at least be in a form and content required to base a certain regulatory approval or decisions concerning the disposition of the crop 12 or harvested crop 22 at issue. In this regard, such a certification process may circumvent or at least mitigate pest investigation and testing burdens or duties by those entities responsible for such regulatory approval or decisions concerning the disposition of the crops 12 or harvested crops 22 at issue. Such reduction in burden may directly translate to mitigation of fees or costs that may have been borne by the growers 10 or passed along to those in the distribution chain. Further, such a certification process is efficient from a time saving point of view thereby speeding the approval or decision making processes allowing for the harvested crops 22 to more readily enter the distribution chain.

Referring now to FIGS. 1 and 3, in accordance with another aspect of the present invention, there is provided a method of providing pest management and crop certification of crops 12 of a plurality of growers 10. In this regard, the following discussion will focus upon the perspective of an operator of the host computer system 40.

The method includes establishing 110 a relationship with the plurality of growers 10 wherein each of the growers agrees to gather pest sampling data 14 in connection with a crop 12 of the grower 10. The pest sampling data 14 includes pest identification information gathered using a pest identification sensor (such as any of 44a–d) and locational information thereof. The gathered pest sampling data 14 is electronically received 112 from the growers 10. The pest sampling data 14 is electronically stored 114 in a pest sampling database 16. Pest management analysis 20 is generated 116 with pest management analysis software 18 using the pest sampling database 16 for a crop 12 of a respective one of the growers 10.

The method may further include issuing of a crop certification 24 of a crop 12 or harvested crop 22 of the respective one of the growers based upon the generated pest management analysis 20. The method may further include providing access to data from the pest management database 16 to a third party 42. In this regard, database access criteria may be received form a respective one of the growers 10, and access to data from the pest management database 18 regarding crops 12 of the respective one of the growers 10 may be selectively provided to the third party 42 based upon the received database access criteria. It is contemplated that a variety of third parties 42 may have interest in the data or derivative data from the pest management database 16. For example, such information may be useful to governmental agencies, entities conducting research or education, entities involved in pest control (such as pesticide manufacturers), health related organizations, and even those interested in commodities trading. Moreover, it is contemplated that such access to data from the pest management database 16 to such third party 42 may take the form of insertion of data as well.

In view of the foregoing, it is contemplated that the various efficiencies of the methods of the present invention provide substantial incentives for participation by growers 10. Through timely, disciplined and automated gathering 100 of the pest sampling data 14, the growers 10 are provided with timely, more accurate pest data analysis 20 which may include corrective or control recommendations. Thus, the earlier a grower 10 can implement such recommendations, costly pest control infestation and establishment problems may be avoided. Further, it is contemplated that as the number of participating growers 10 increases, a more comprehensive, integrated, and accurate pest sampling database 16 results. This in turn is contemplated to result in a higher, more comprehensive, and timely pest management analysis 20.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A method of pest management of crops by a grower comprising the steps of:
   a) gathering pest sampling data in connection with a crop of the grower, the pest sampling data including pest identification information gathered using a pest identification sensor, the pest sampling data further including locational information thereof;
   b) transmitting the gathered pest sampling data to a pest sampling database, the pest sampling database including pest sampling data regarding respective crops from a plurality of other growers, the pest sampling database being in electrical communication with pest management analysis software for generation of pest management analysis, the pest management analysis software including a filter configured to identify a pest type based upon the gathered pest identification information and the locational information thereof; and
   c) electronically receiving the generated pest management analysis.

2. The method of claim 1 wherein step a) the pest identification sensor is acoustic sensor.

3. The method of claim 1 wherein step a) the pest identification sensor is an optical sensor.

4. The method of claim 1 wherein step a) the pest identification sensor is a weight sensor.

5. The method of claim 1 wherein step a) includes using at least two different types of pest identification sensors.

6. The method of claim 1 wherein step a) further includes deploying the pest identification sensor in conjunction with a pest trap.

7. The method of claim 6 wherein the pest trap utilizes a pest attractant and the pest sampling data includes identification of the attractant.

8. The method of claim 1 wherein the pest identification sensor is configured to detect wingbeat information.

9. The method of claim 1 wherein the pest identification sensor is configured to detect pest surface characteristics information.

10. The method of claim 1 wherein the pest identification sensor is configured to detect size information.

11. The method of claim 1 wherein the pest management analysis software is configured to identify pests based upon the pest identification information and the locational information.

12. The method of claim 1 wherein step a) the pest sampling data is gathered utilizing a portable computer.

13. The method of claim 1 wherein step a) the pest identification information is transmitted from the pest identification sensor via a wireless device.

14. A method of providing pest management of a plurality of growers, the method comprising the steps of:
   a) establishing a relationship with the plurality of growers wherein each of the growers agrees to gather pest sampling data in connection with a crop of the grower, the pest sampling data including pest identification information gathered using a pest identification sensor, the pest sampling data further including locational information thereof;
   b) electronically receiving gathered pest sampling data from the growers;
   c) electronically storing the pest sampling data in a pest sampling database; and
   d) generating pest management analysis with pest management analysis software using the pest sampling database for a crop of a respective one of the growers, the pest management analysis software including a filter configured to identify a pest type based upon the gathered pest identification information and the locational information thereof.

15. The method of claim 14 wherein step a) the pest identification sensor is an acoustic sensor.

16. The method of claim 14 wherein step a) the pest identification sensor is an optical sensor.

17. The method of claim 14 wherein step a) the pest identification sensor is a weight sensor.

18. The method of claim 14 wherein step a) includes using at least two different types of pest identification sensors.

19. The method of claim 14 wherein step a) further includes deploying the pest identification sensor in conjunction with a pest trap which utilizes a pest attractant and the pest sampling data includes identification of the attractant.

20. The method of claim 14 wherein the pest identification sensor is configured to detect wingbeat information.

21. The method of claim 14 wherein the pest identification sensor is configured to detect pest surface characteristics information.

22. The method of claim 14 wherein the pest identification sensor is configured to detect size information.

23. The method of claim 14 wherein the pest management analysis software is configured to identify pests based upon the pest identification information and the locational information.

24. The method of claim 14 wherein the pest management analysis software is configured to identify pests based upon the pest identification information and pest seasonal activity information.

25. The method of claim 14 wherein the pest management analysis software is configured to identify pests based upon the pest identification information and pest circadian rhythm information.

26. The method of claim 14 wherein the pest management analysis software is configured to identify pests based upon the pest identification information and pest geographical distribution information.

27. The method of claim 14 wherein the pest management analysis software is configured to identify pests based upon the pest identification information and pest habitat information.

28. The method of claim 14 wherein the pest management analysis software is configured to identify pests based upon the pest identification information and pest attractant information.

* * * * *